United States Patent Office

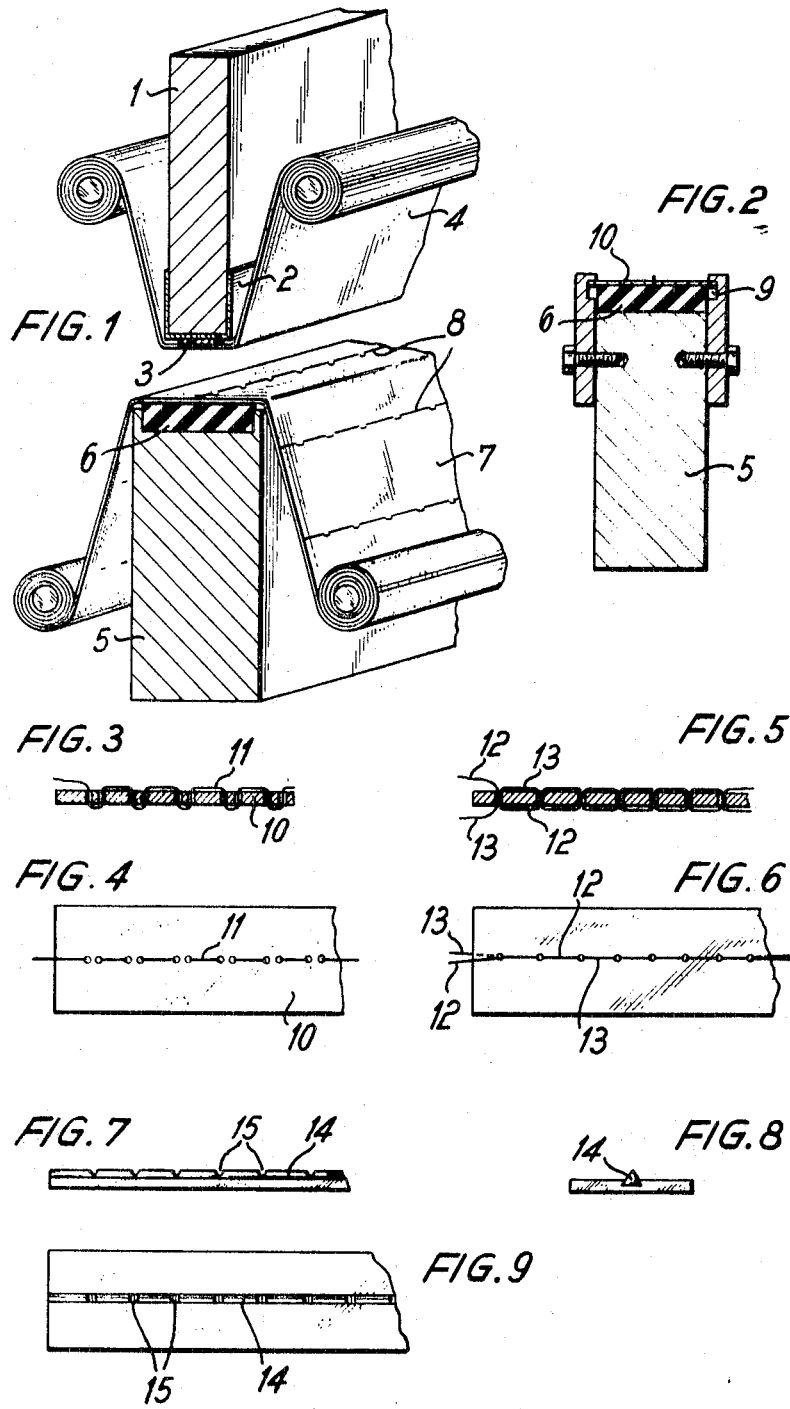

3,551,259
Patented Dec. 29, 1970

3,551,259
APPARATUS FOR MAKING HEAT-SEALS WITH A WEAKENED TEAR LINE
August Schwarzkopf, Lengerich, North Rhine-Westphalia, Germany, assignor to Windmoller & Holscher, Lengerich, Westphalia, Germany
Filed Oct. 27, 1967, Ser. No. 678,559
Claims priority, application Germany, Dec. 6, 1966, W 42,922
Int. Cl. B32b *31/20;* B30b *15/06*
U.S. Cl. 156—581                                8 Claims

ABSTRACT OF THE DISCLOSURE

In apparatus for heat sealing at least two superimposed plies of synthetic thermoplastic sheeting with simultaneous formation of a weakened tear line adjacent to the heat-sealed seam, the heat sealing jaw comprises a heating element having a striplike heat sealing surface, the unheated backing jaw has a resilient abutment layer, and a thin bead element extends over the engaging surface of the two jaws, preferably oven the engaging surface of the unheated backing jaw, approximately along the longitudinal center line of the area of the heat-sealed seam. That portion of the bead element which protrudes from the engaging surface of the respective jaw has interruptions, which are closely spaced in the longitudinal direction. The bead element is connected to its support at least adjacent to the interruptions.

This invention relates to a heat sealing apparatus for heat sealing at least two superimposed plies of synthetic thermoplastic sheating with simultaneous formation of a weekend tear line adjacent to the heat-sealed seam, in which apparatus the heat sealing jaw comprises a heating element which has a striplike heat sealing surface and the backing jaw is unheated and has a resilient abutment layer.

In the processing of plastics material sheeting to form bags and wrappers for various articles, e.g., tapered wrapping bags, it is often necessary to join two or more sheeting plies by a flat heat-sealed seam and to provide a line of weakness in the middle of the heat-sealed seam or between two heat-sealed seams so that the individual bags or the like can be severed along said line of weakness by manual tearing.

As the heat-sealed sections should still be connected by the line of weakness so that the webs of material connected by the heat-sealed seams can be rewound or can be advanced in the processing machine while at least some sections are interconnected and multicompartment bags having a predetermined number of compartments can subsequently be formed, e.g., for packaging ladies' stockings, and such bags can be superimposed at the delivery station where they are collected, the heat-sealed seam must be cooled to such an extent before the jaws are opened that a tensile loading which is effective during the further feeding can no longer tear open or sever the seam. This would be the case if the seam line were too hot when the further feeding of the sheeting begins.

For this reason, the described heat-sealed seams are generally made by heat pulse sealing, in which the seam is cooled under pressure until it has solidified or in any case by a process which is similar in effect to heat pulse sealing in that the sheeting web is not subjected to tension until the seam line just formed has been sufficiently cooled. The latter purpose may be accomplished by the provision of retaining jaws, which lag behind the heat sealing jaws and are opened only when the heat sealing jaws have been opened and sufficient cooling, which is partly assisted by cooling air, has been effected.

The simplest of the known heat sealing processes in which a weakened tear line is formed is the so-called squeeze seam sealing process. In this process, a thin circular wire, which is covered with Teflon, is forced onto the sheeting, which lies on a resilient pad. The circular wire is heated for a short time so that the wire causes a fusion of the two sheeting webs to be sealed and partly penetrates into said webs. This results in a decrease of the total thickness of the sheeting while the displaced material rises in the form of a fused bead on the left and right of the line of pressure which is established by the wire.

This process has the advantage that a very narrow seam is produced on both sides of the line of weakness which has been impressed by the wire. It has the great disadvantage, however, that the heat sealing temperature and pulse duration must be highly critically controlled in dependence on the thickness and nature of the sheeting. An even slightly excessive heat seal temperature may result in a severing and heat sealing operation rather than in a formation of a line of weakness. If the temperature is slightly below the required value, a satisfactory weakened tear line will not be produced and the bags, wrappers of the like can become torn in themselves when they are being severed. The use of the heat sealing wire has also the disadvantage that it does not dissipate the heat generated by the heat pulse into the sheeting at a sufficiently high rate and the residual heat is reduced only after a prolonged cooling time under the pressure of the jaws to such an extent that the impressed line having the reduced cross-section has sufficiently solidified to resist an undesired tearing during the subsequent further feeding of the sheeting web.

When a thin wire is used, the cooling under pressure is sufficiently fast but the two squeezed edges forming the seam are too weak and insufficiently durable. When a thick wire is used, the seams are wider and more durable but the cooling takes more time, in accordance with the larger wire volume, so that this process is uneconomical.

It has also been attempted to find a way out in that the round wire is replaced by a flat strip, on which a low rib is provided, which extends along the longitudinal center line and which produces the line of weakness whereas the two legs on both sides of the line of weakness produce the heat seal. In this case too, the relatively high heat capacity of the heating strip necessitates a considerable cooling time. Besides, the selection of the correct heat sealing temperature and of the correct pulse duration is of decisive significance for the quality of the product; even slight errors may lead to rejects.

Heat sealing tools have also been disclosed in which a conventional flat heat pulse strip is provided on the heated heat sealing jaw whereas the line of weakness in the relatively wide flat seam is formed with the aid of a thread or wire, which is thin in cross-section and is stretched across the resilient pad of the unheated backing jaw. This arrangement has the disadvantage that the thread or wire used for generating the line of weakness may easily become anchored in the sheeting web and will be carried along and torn off when the feeding is resumed. With this arrangement too, the heat sealing temperature must be controlled within very close limits.

It is an object of the invention to provide a heat sealing apparatus for heat sealing at least two superimposed plies of synthetic thermoplastic sheeting with simultaneous formation of a weakened tear line adjacent to the heat-sealed seam, in which apparatus the heat sealing jaw comprises a heating element having a striplike heat sealing surface, the unheated backing jaw has a resilient abutment layer, and a thin bead element extends over the engaging surface of one of the two jaws, preferably over the engaging surface of the unheated backing jaw, approximately along the longitudinal center line of the area of the heat-sealed seam, and to improve such apparatus in such a manner that the production of a satisfactory weakened tear line adjacent to the flat heat-sealed seam is no longer dependent, or is less dependent than with the known apparatus, on the control of the heat sealing temperature and heat sealing time within close limits. The heat sealing apparatus according to the invention should also ensure that the bead element can no longer become anchored in and be carried along by the sheeting plies.

In a heat sealing apparatus of the type just defined, this object is accomplished according to the invention in that that portion of the bead element which protrudes from the engaging surface of the respective jaws has interruptions, which are closely spaced in the longitudinal direction, and the bead element is connected to its support at least adjacent to the interruptions. The interruptions in the bead element result in the formation of unweakened lands adjacent to the line of weakness and the length of said lands can be determined by the selection of the length of the interruptions. The successive sections of the joined webs, which sections are defined by heat-sealed seams, will be held together by these lands having an unreduced thickness of material even if these portions of the bead element which extend above the respective engaging surface have entirely penetrated through the two webs. On the other hand, the heat sealing temperature and the heat sealing time can always be selected so that a satisfactory heat sealing and a sufficiently deep penetration of the bead element is ensured because the two joined sheeting plies cannot be completely severed.

In another desirable development of the invention, the bead element may be connected as a single or double stitchline to a layer of an antiblocking material, preferably Teflon, which covers the engaging surface of the jaw. The interruptions resulting in the formation of the lands are formed at the points where the sewing thread enters the material. The sewing thread may consist of a ply yarn, preferably of Teflon filaments, or of a wire. In the case of a double stitchline, one of two threads lies over the antiblocking layer and the other lies under said layer at any given point, and the interruptions are very short so that the lands where the thickness of the sheeting is not reduced are very narrow.

According to the invention, the layer of antiblocking material which covers the jaw surface consists of a readjustable tape of Teflon filament fabric, which has a width corresponding to the length of the jaws and which is wound up on reels on both sides of the engaging surface of the jaws and is provided with spaced apart stitchlines. When the tape has become worn at the point which was previously disposed over the engaging surface of the jaw, the tape is further wound up on one of the reels so that a new tape portion having a new stitchline is moved into the heat sealing area.

On the other hand, the layer which covers the engaging surface of the unheated backing jaw may consist of a solid strip of antiblocking material, which strip covers the resilient abutment and is provided along its longitudinal center line with a stitchline or a wire, which is partly embedded in the antiblocking material and in its protruding portion is provided with closely spaced notches. In this case the holder for the strips of antiblocking material may be designed so that the strip lying over the resilient pad can easily be replaced after a certain time of use.

The invention will now be explained more fully in the following description with reference to the drawing, which shows several embodiments by way of example.

In the embodiment shown in FIG. 1, the upper jaw member 1 constituting the heated heat sealing jaw is provided with an electrically insulating layer 2, over which a pulse heating strip 3 is stretched. In the present embodiment, this pulse heating strip 3 is covered by a readjustable, heat-resisting covering tape 4 of an antiblocking material, such as Teflon.

The unheated backing jaw 5 carries the resilient backing pad 6, which may consist, e.g., of silicone rubber. This backing pad is also covered by a readjustable, heat-resisting tape 7, which consists also preferably of Teflon filament fabric. According to the invention, the tape 7 is provided with parallel running stitchlines 8. The two rollers disposed on both sides of the jaw 5 and serving to unwind and wind up the tape 7 may be rotated to move the stitchlines 8 to such a position under the heat sealing tape 3 that the stitchline is impressed ino the sheeting plies, not shown in the drawing, which are diposed between the jaws when these are closed and the heat sealing strip is heated. The resulting impressed line is disposed approximately at the longitudinal center line of the heat-sealed seam, which has the same width as the heating strip. The interrupted thread portions which protrude along the stitchline are impressed into the sheeting which is disposed between the plies so that the thickness of the sheeting is reduced adjacent to these thread portions. Adjacent to the short gaps between the thread portions, lands of the sheeting are preserved so that the heat-sealed seam cannot be completely severed but will only be perforated if the thread portions entirely penetrate the sheeting.

As has been mentioned hereinbefore, the stitchline 8 may consist of ply yarn or of thin wire. In the latter case, the higher thermal conductivity of a metal wire is utilized so that more pronounced perforations are impressed into the thermoplastic film.

FIG. 2 shows a modified embodiment. Instead of the readjustable Teflon tape having running stitchlines, a solid Teflon strip 10 is slidably inserted in grooves 9 of the unheated backing jaw over the silicone rubber pad 6. This Teflon strip carries the interrupted bead element and easily be replaced after substantial wear.

FIG. 3 is an enlarged sectional view showing the strip 10. The bead element is formed by a fine wire 11, e.g., of nickel-chromium steel or silver and is stitched into the strip 10 so that relatively long, protruding wire portions alternate with relatively short interruptions.

FIG. 4 is a top plan view showing the strip of FIG. 3.

In the modified embodiment shown in FIGS. 5 and 6, a double stitchline is used, which consists of the wires 12 and 13. The same appear on the surface in alternation so that only very narrow connecting lands are formed in the sheeting where the wires enter. FIG. 6 is a top plan view showing the strip of FIG. 5.

In the embodiment shown in FIGS. 7 to 9, a wire 14 having, in the present embodiment, a triangular cross-section is embedded in the Teflon strip and anchored therein with its base. The sharp protruding edge of the triangle is provided with closely spaced notches 15, which are formed so that the desired lands connecting the heat-sealed sheeting plies are retained.

What is claimed is:

1. A heat-sealing apparatus for heat-esealing at least two superimposed plies of synthetic thermoplastic material and for simultaneously forming a weakened tear line in the region of the heat-sealed seam, comprising a heat-sealing jaw and an unheated backing jaw cooperating in their closed position so as to heat-seal said thermoplastic material which is fed between them, said heat-sealing jaw comprising a strip-like pulse heating element and arranged at the surface engaging said thermoplastic material, said backing jaw comprising a resilient abutment layer and a covering layer of antiblocking material and a thin bead element extending over said antiblocking layer, said bead element comprising a plurality of closely spaced interruptions and being connected to said antiblocking layer at least in the region of said interruptions.

2. Apparatus as defined in claim 1, wherein said bead element is a thread affixed to said antiblocking layer.

3. Apparatus as defined in claim 1, wherein said bead element is a wire affixed to said antiblocking layer.

4. Apparatus as defined in claim 1, wherein said antiblocking layer consists of an adjustable tape of Teflon filament fabric having a width corresponding to the length of said backing jaw and being wound up on reels one on each side of said backing jaw and provided with a plurality of said bead elements in a spaced-apart arrangement.

5. Apparatus as defined in claim 1, wherein said antiblocking layer is a solid strip held in grooves of said backing jaw.

6. Apparatus as defined in claim 5, wherein said bead element comprises a wire partly embedded in said antiblocking layer and provided with closely spaced notches in its protruding portion.

7. Apparatus as defined in claim 1, wherein said strip-like pulse heating element is covered with a heat resisting tape.

8. Apparatus as defined in claim 7 wherein said layer is a Teflon filament fabric tape.

References Cited

UNITED STATES PATENTS

| | | | |
|---|---|---|---|
| 3,033,257 | 5/1962 | Weber | 156—515X |
| 3,053,723 | 9/1962 | Plach et al. | 156—515X |
| 3,236,714 | 2/1966 | Traut | 156—323X |
| 3,271,560 | 9/1966 | Schott, Jr. | 156—515X |

BENJAMIN A. BORCHELT, Primary Examiner

J. J. DEVITT, Assistant Examiner

U.S. Cl. X.R.

156—583, 515